(No Model.)

M. BLAKEY.
WELDING SEAMS OF PIPES.

No. 433,591. Patented Aug. 5, 1890.

WITNESSES:
Darwin L. Wolcott
F. E. Gaither.

INVENTOR,
Mildred Blakey
by George H. Christy
Att'y.

UNITED STATES PATENT OFFICE.

MILDRED BLAKEY, OF PITTSBURG, PENNSYLVANIA.

WELDING SEAMS OF PIPES.

SPECIFICATION forming part of Letters Patent No. 433,591, dated August 5, 1890.

Application filed May 1, 1890. Serial No. 350,147. (No model.)

*To all whom it may concern:*

Be it known that I, MILDRED BLAKEY, a citizen of the United States, residing at Pittsburg, in the county of Allegheny and State of Pennsylvania, have invented or discovered certain new and useful Improvements in Welding Pipes, of which improvements the following is a specification.

The invention described herein relates to certain improvements in the manufacture of wrought iron or steel pipes or tubes, which, in accordance with the present practice, are formed by bending a strip of metal, or, as it is known, a "skelp," longitudinally into tubular form, and then welding the adjacent longitudinal edges. These edges are joined either by a butt-weld or by a lap-weld. The former is preferable when uniformity in the thickness of the walls of the pipe is desired, but is objectionable on account of the difficulty of making a good weld. The lap-weld is preferable as insuring a good weld, but is objectionable for the reason that the edges are liable to lap over too far, and hence the metal is stretched in forcing the ball through during the welding process, and thereby reducing the walls in thickness.

The object of this invention is to combine the desirable features of both methods of forming pipes and avoid the objectionable characteristics; and the invention consists in uniting the edges of the skelp by a welding key or strip, as will be hereinafter more fully described and claimed.

Figure 1:
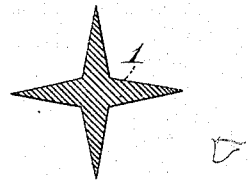
Figure 2:
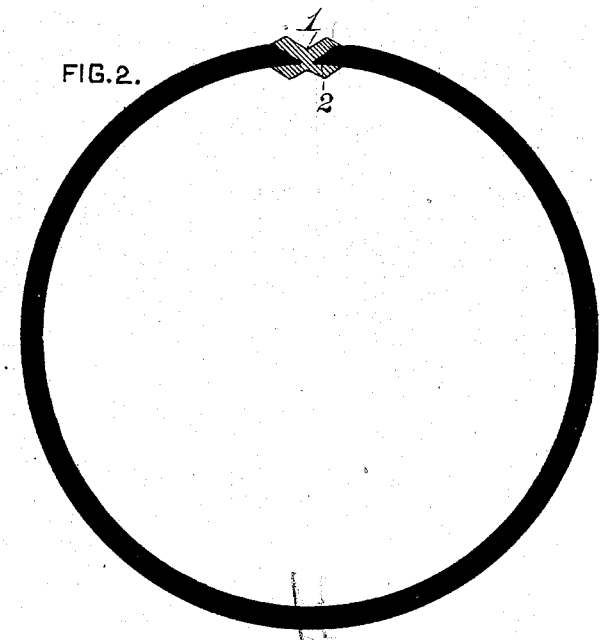
Figure 3:
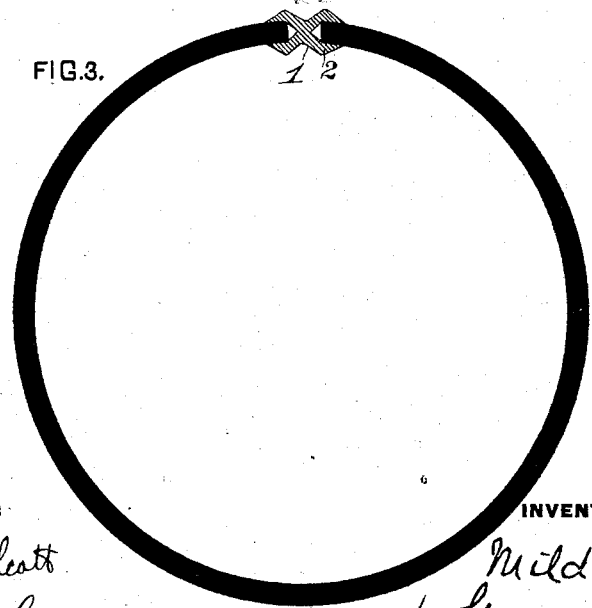

In the accompanying drawings, forming a part of this specification, Figure 1 is a sectional elevation of my improved welding key or strip as it comes from the rolls. Fig. 2 is a sectional view of a skelp having scarfed or beveled edges, showing the arrangement of the welding-key between its edges; and Fig. 3 is a similar view, the skelp having square or unbeveled edges.

In the practice of my invention the strip or skelp is formed in the usual manner, except that it is made a little narrower to allow for the interposition of the welding key or strip 1, as will be hereinafter described. This welding key or strip is preferably formed by rolling a bar or billet between rolls having grooves or passes suitably constructed according to rules well known in the art, for the reduction of the bar or billet to a strip star-shaped in cross-section, as shown in Fig. 1. The points or spurs can be closed or bent toward each other in pairs by passing the star-shaped bars between suitable rolls, thereby forming grooves on opposite sides of the bar, as shown in Figs. 2 and 3, for the reception of the edges of the skelps. The strip or key thus formed may be slid between the edges of the skelp after it is bent into tubular form, or, and as I prefer, the strip is held in such relation to the skelp-bending machine that the edges of the skelp may enter and slide along the grooves 2 of the strip or key as the skelp is drawn through the machine. After the skelp and key are adjusted together, as described, they are placed in a suitable furnace and heated to the proper temperature and then welded together in the manner usual in lap-welding.

Care should be taken in forming the skelps and the welding-key, as regards the width of each, that the finished pipe shall be of the standard internal diameter, and that the welding-key should be so proportioned as regards its cross-sectional area that it can be reduced in the welding operation to the same thickness as the wall of the pipe. It is obvious that the key 1 will effectually prevent any change during the heating of the skelp as will render necessary any stretching of the metal during the welding operation, and that therefore a uniformity of thickness of the pipe-walls incident to the ordinary butt-weld can be attained in connection with the superiority of weld inherent in the present lap-weld practice. The edges of the skelp may be scarfed, as shown in Fig. 2, or cut square, as shown in Fig. 3.

I am aware that pipe have been formed by bending the projecting arms of an H-section strip of metal down behind flanges formed along the edges of sheets or plates, as described in English Letters Patent No. 2,157 of 1883. In this construction the locking-strip engages ribs along the interior and exterior surface of the pipe, and cannot be reduced to a thickness uniform with that of the metal sheet or plate, whereas in my construction the thickness of the pipe-wall is approximately uniform throughout.

In the practice of my invention the skelp employed does not differ materially as regards construction from the skelp as ordinarily made.

I claim herein as my invention—

1. In the manufacture of wrought-iron pipes and tubes of substantially uniform thickness along the joints as elsewhere, a welding key or strip approximately of the thickness of the skelp to which it is to be applied and having a groove in each edge thereof, in combination with a practically plain-edged skelp, whereby a welding-pass will produce the desired uniform thickness, substantially as set forth.

2. A welding key or strip having a groove along each edge for the reception of a practically plain-edged skelp, and approximating in thickness the skelp to which it is to be applied with reference to its reduction in the welding operation to the same thickness as the skelp, substantially as set forth.

In testimony whereof I have hereunto set my hand.

MILDRED BLAKEY.

Witnesses:
W. B. CORWIN,
DARWIN S. WOLCOTT.